UNITED STATES PATENT OFFICE.

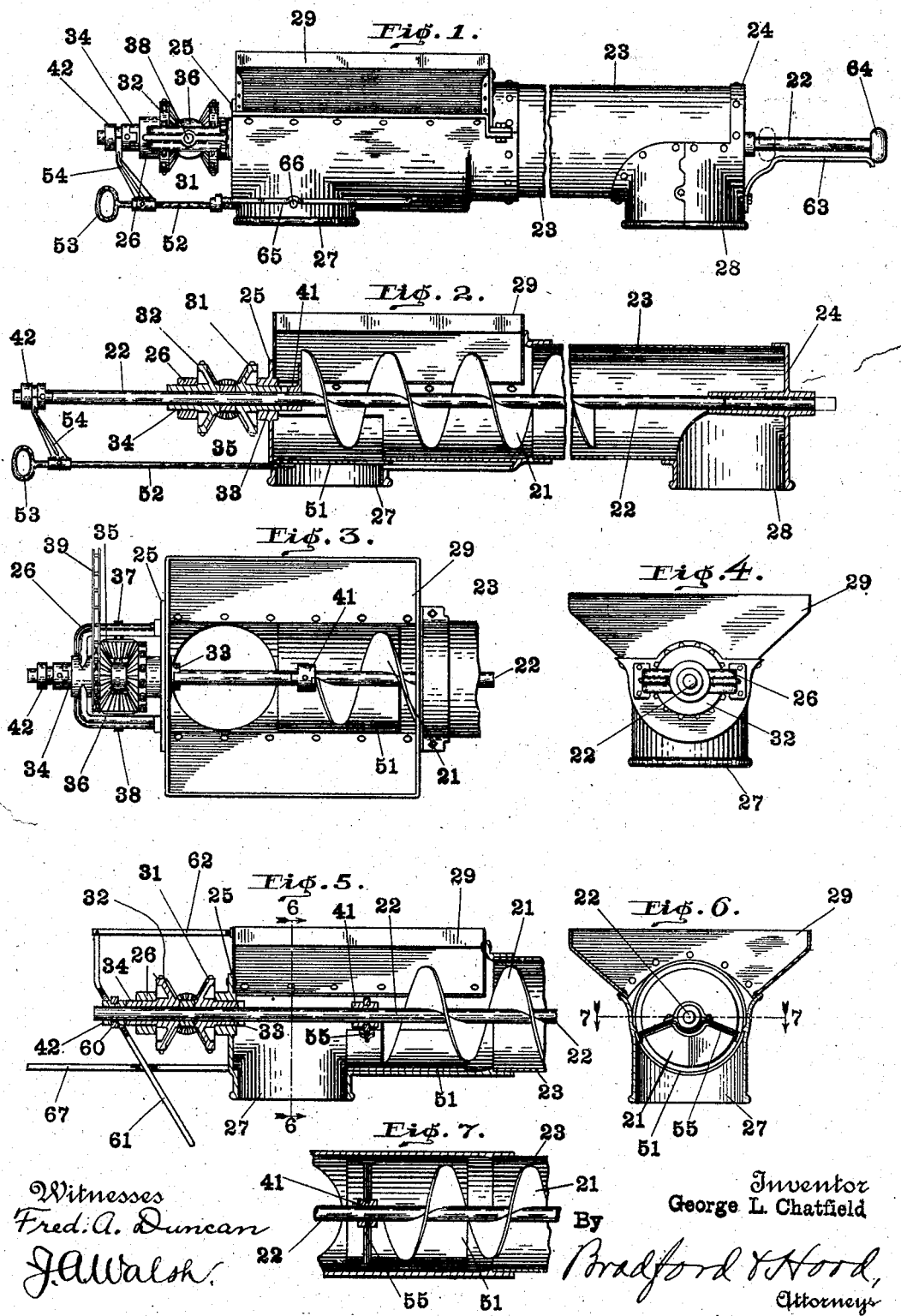

GEORGE L. CHATFIELD, OF INDIANAPOLIS, INDIANA.

SCREW CONVEYER.

No. 806,643.  Specification of Letters Patent.  Patented Dec. 5, 1905.

Application filed September 11, 1905. Serial No. 277,950.

*To all whom it may concern:*

Be it known that I, GEORGE L. CHATFIELD, a citizen of the United States, residing at Indianapolis, in the county of Marion and State of Indiana, have invented certain new and useful Improvements in Conveyers, of which the following is a specification.

My present invention relates more particularly to that class of screw conveyers in which in the course of their operation the direction of rotation of the screw needs to be reversed.

I have shown this invention as applied to that variety of conveyers used in the handling of grain which are commonly called "cross-conveyers" and are usually embodied in the elevating, weighing, and conveying apparatus with which threshing-machines or separators are quite generally equipped.

The accompanying drawings illustrate such an apparatus embodying my said invention.

Figure 1 is a side elevation of such a conveyer, the central portion being broken away in order that the drawing may be made to a suitable scale; Fig. 2, a central vertical sectional view of the same, but with the screw and screw-driving mechanism shifted; Fig. 3, a top or plan view of the end of said conveyer carrying the driving and reverse gear mechanism; Fig. 4, an end elevation thereof; Fig. 5, a view similar to a portion of Fig. 2, but illustrating an alternative arrangement of valve and means for moving the same; Fig. 6, a transverse vertical sectional view as seen when looking in the direction of the arrows from the dotted lines 6 6 in Fig. 5, and Fig. 7 a detail horizontal sectional plan view as seen when looking downwardly from the dotted line 7 7 in Fig. 6.

The screw 21 has the usual shaft 22 and is surrounded by and operates in a tube or casing 23 in the usual and well-known manner. The free end of the shaft 22 rests in a bearing in a head or end 24 of the casing. The driven end of said shaft passes loosely through the hubs of gears, (presently to be described,) which gear-hubs form the bearings for said shaft at that end. In the head or end 25 of the casing is formed a bearing for one of said gear-hubs, and a bracket 26 extends out from said head and forms a bearing for the other gear-hub. The tube or casing is provided with two discharging-mouths 27 and 28, one at each end. At one end an ingress-opening or hopper 29 is provided, and at this same end a valve or gate 51 is provided to close the discharge-opening upon occasion, as will be presently described.

The two gears 31 and 32 (being those already referred to) have comparatively long hubs 33 and 34. Said hubs rest in the bearings provided therefor in the head 25 and bracket 26 and are adapted to revolve loosely in said bearings. These hubs have central longitudinal openings, which, as before stated, form bearings for the screw-shaft 22. Two other gears 35 and 36 are mounted upon suitable stud-shafts 37 and 38, (carried by the bracket 26,) and all of these gears when assembled are in train, so that all four of said gears are engaged and rotate together, as is best shown in Fig. 3.

Upon the shaft 22 are clutch members 41 and 42, and these are adapted to engage with similar clutch members formed upon the adjacent ends of the hubs 33 and 34. All the gear-wheels being in train, they are all driven by or drive the one engaged to the shaft by means of its clutch member, and as the two wheels 31 and 32 rotate in opposite directions the screw is driven in one direction or the other, according to which of said wheels is in clutch engagement. When, therefore, the shaft 22 is moved endwise in one direction, so that, for example, the clutch member 41 is in engagement with the hub 33 of the corresponding gear-wheel, the shaft and said gear-wheel must rotate together in one direction. When the shaft 22 is so moved as to throw the other clutch member 42 into engagement with the hub 34 of the other gear-wheel, the shaft will be caused to rotate with said gear-wheel in the other direction, as will be readily understood.

The gear-wheels 31 and 32 are designed as driving-wheels also, and they are therefore adapted to be driven by suitable power-transmission devices (not shown) from any suitable source of power. The rims of these gear-wheels 31 and 32 are adapted to receive power from suitable power-transmission devices. I have shown them as formed with sprocket-teeth, so as to constitute them also sprocket-wheels, and in this form they are adapted to be driven by sprocket-chains, as 39, Fig. 3, in an ordinary and well-known manner. While they are alike in this respect, so that either may be driven directly, obviously the driving means is to be applied to only one of them in any given case. Both are shown as thus equipped in order that the conveyer may be conveniently used as a "right-hand" or as a "left-hand" machine, which is done by simply applying the driving-chain to one or the other of these two wheels. This is useful, because in the practical application of elevators and weighers to threshing-machines (which is the use for which my invention has been especially designed) some such machines require the elevator to be upon the right-hand side of the separator, while others require it to be upon the left-hand side. This, however, has nothing to do with the ordinary reversal of motion of the screw of the conveyer, which is effected simply by shifting the clutch members, as before described, by moving the shaft itself longitudinally until the desired clutch member 41 or 42 (which is rigid therewith) engages with the corresponding member on the hub of the adjacent wheel.

The distance which the shaft moves longitudinally in shifting is preferably about equal to the diameter of the discharge-orifice of the conveyer. This is for two purposes. One is that it removes the screw from over the said discharge-opening, leaving the passage free, or nearly so, which much facilitates the discharge of the grain at the end where it is introduced or at that end which is directly below the hopper. When it is designed to discharge the grain at the other end, the screw moves up to, or nearly to, the end 25, where it will be most effective. The gate or valve 51 is also connected to the shaft and travels therewith. When the shaft is moved toward the hopper or receiving end, it thus not only moves the screw up toward said end, but also moves the gate across the opening below. When the shaft is moved in the other direction, it not only moves the screw out of the way, as above described, but also moves the gate or valve 51 to its open position. I have shown in these views two arrangements of this gate or valve and means for attaching the same to the shaft so that it will move therewith. In Figs. 1 and 2 I have shown it as operated by a thrust-rod 52, having a handle 53, from which a bracket-like fork 54 extends up and engages with a circumferential groove or a suitable collar on a part (shown as formed integrally with the clutch member 42) carried by the shaft 22. In Figs. 5 and 6 I have shown the valve or gate entirely inside the tube and operated by means of a cross-bracket 55, attached thereto and engaging with a circumferential groove in a suitable part, as the clutch member 41, or an equivalent collar on the shaft at a point within the conveyer. In either case the shaft is free to revolve in respect to this gate or valve, but operates to move it longitudinally when said shaft is thus moved. In the latter construction I have opportunity for a shaft-shifting handle 61 on the outer end. This I have shown as engaging, by means of a trunnion-ring 60, with the same circumferential groove with which the bracket-like fork is shown as engaging with, Figs. 1 and 2, but as connected to the end of the conveyer by means of a link 62. This is in some respects a desirable construction, as it brings an operating-handle down into convenient reach of the operative.

In order to insure the continuous operation of the conveyer in the situation to which it has been adjusted, I may provide detents to hold the shaft to one or other of its positions. In Fig. 1 one form of the detent is shown as a spring 63, engaging with a knob 64 on the shaft, the form being such that it is held to either one of its two positions by said spring, as will be readily understood. When the rod 52 is used, the spring-detent may be attached to it, if desired, as shown in Fig. 1, where such spring-detent 65 is shown as engaging with a projection 66 on the adjacent structure. In the form shown in Fig. 5 a still different arrangement may be adopted, such as a detent or latch 67, adapted to engage with the handle 61 and hold it to either of its two positions.

By means of my invention I am enabled to utilize the shaft itself as the means of shifting the clutches instead of being under the necessity of using external and separate shifting-rods with their attendant complications. I am also enabled to more effectively utilize the screw conveyer itself, as in the one position I bring it nearly to the outer end of the hopper, where it operates to urge the grain toward the opposite end without its action being hampered by any opposing or obstructive bearings or any necessity of dividing the screw into parts, while when the discharge is at the hopper end I not only reverse the motion of the screw, but move it practically out of the way of the opening, leaving a free passage for the grain. No splines are necessary on the shaft, as the gear-wheels 31 and 32 are not only mounted to rotate freely in their own bearings, but permit the free rotation of the shaft therein at all times except when engaged with the corresponding clutch members, while said clutch members 41 and 42 are rigidly secured to said shaft by set-screws, pins, or in any other cheap and simple way and are never moved on or in respect to said shaft at all after being properly adjusted and secured.

While I have shown a lever-like handle, as 61, or a push-rod having a handle, as 52 53, for moving the shaft, I do not consider these to be necessary, as the shaft can be moved by hand easily, as by means of a simple plain handle, as the knob 64; neither do I consider any detent, as 63, 65, or 67, necessary to hold the clutch parts into engagement, as the thrust of the grain tends to hold them together and the friction of the valve or gate on the adjacent parts is sufficient to keep them from becoming disassembled when the conveyer is running idle.

When it is desired to stop the motion of the conveyer altogether, it can easily be done by moving the shaft to an intermediate position when both of the clutches are out of engagement, as will be readily understood.

In Fig. 2 I have shown the hub of the shaft-bearing in the head 24 as projecting inwardly for some distance and the shaft 22 as cut shorter than in Fig. 1. By this means I am able to keep the shaft from projecting so far, which is sometimes of advantage when it is desired to use the conveyer in situations where said shaft would otherwise project farther than desired.

Having thus fully described my said invention, what I claim as new, and desire to secure by Letters Patent, is—

1. The combination, in a screw conveyer, of the screw, its shaft, a casing therefor having a discharging-mouth at each end, a train of reversing-gears carried by the casing and adapted to be shifted by a longitudinal movement of the shaft, and clutching devices adapted to be thrown into and out of engagement by the longitudinal movement of the shaft.

2. The combination, in a screw conveyer, of the screw, its shaft, a casing therefor having a discharging-mouth at each end, a train of reversing-gears adapted to be shifted by a longitudinal movement of the shaft, a valve adapted to close one of said mouths, a connection between said valve and said shaft, and clutching devices adapted to be thrown into and out of engagement by the longitudinal movement of the shaft.

3. The combination, in a screw conveyer, of the casing having a discharging-mouth at each end, a shaft adapted to be moved longitudinally in its bearings, a screw mounted on said shaft in such relation to one of said mouths that it will extend across said mouth when the shaft is moved to one position and leave said mouth open when the shaft is moved to the other position, and suitable reversing-gears adapted to be actuated by the longitudinal movement of the shaft, whereby the screw is rotated in one direction when in one position and in the other direction when in the other position.

4. The combination, in a screw conveyer, of the casing having a discharging-mouth at each end, a shaft adapted to be moved longitudinally in its bearings, a screw mounted on said shaft in such relation to one of said mouths that it will extend across said mouth when the shaft is moved to one position and leave said mouth open when the shaft is moved to the other position, suitable reversing-gears adapted to be actuated by the longitudinal movement of the shaft whereby the screw is rotated in one direction when in one position and in the other direction when in the other position, and a detent for holding the shaft to position when shifted.

5. The combination, in a screw conveyer, of the casing having a discharging-mouth at each end, a shaft adapted to be moved longitudinally in its bearings, a screw mounted on said shaft in such relation to one of said mouths that it will extend across said mouth when the shaft is moved to one position and leave said mouth open when the shaft is moved to the other position, suitable reversing-gears adapted to be actuated by the longitudinal movement of the shaft whereby the screw is rotated in one direction when in one position and in the other direction when in the other position, and a handle for shifting said shaft from one position to the other.

6. The combination, in a screw conveyer, of the casing having a discharging-mouth at each end, a shaft adapted to be moved longitudinally in its bearings, a screw mounted on said shaft in such relation to one of said mouths that it will extend across said mouth when the shaft is moved to one position and leave said mouth open when the shaft is moved to the other position, suitable reversing-gears adapted to be actuated by the longitudinal movement of the shaft whereby the screw is rotated in one direction when in one position and in the other direction when in the other position, and a valve operated by said shaft for closing and opening said mouth.

7. The combination, in a screw conveyer, of the casing having a discharging-mouth at each end, a shaft adapted to be moved longitudinally in its bearings, a screw mounted on said shaft in such relation to one of said mouths that it will extend across said mouth when the shaft is moved to one position and leave said mouth open when the shaft is moved to the other position, suitable reversing-gears adapted to be actuated by the longitudinal movement of the shaft whereby the screw is rotated in one direction when in one position and in the other direction when in the other position, and a valve operated by said shaft for closing and opening said mouth, the engagement between said valve and said shaft being by means of an annular groove or collar on the shaft and a bar secured to said valve and entering said groove.

8. The combination of a casing or framework, a train of gears mounted loosely in bearings carried thereby, a shaft running loosely in bearings formed in the hubs of the two gears which are in line, and clutch members rigidly secured to the shaft outside the gears and adapted to engage with the adjacent ends of the gear-wheel hubs, which form the other clutch members, the engagement and disengagement being effected by longitudinal movement of the shaft itself.

9. The combination of a casing or framework, a train of gears mounted loosely in bearings carried thereby, the hubs of two oppositely-disposed gears forming also clutch members, a shaft running loosely in bearings formed in said hubs, clutch members rigidly secured to the shaft and adapted to engage with said clutch members on said hubs, and means for moving said shaft longitudinally in its bearings, thus engaging one set of clutches when moved in one direction and engaging the other set of said clutches when moved in the other direction, whereby the direction of rotation of the shaft is reversed by a longitudinal movement of the shaft itself.

10. The combination of a casing or framework, a train of gears loosely mounted in bearings carried thereby, a shaft running loosely in bearings formed in the hubs of two of said gears, clutching devices operated to engage said shaft and one or the other of said gears by a longitudinal movement of said shaft, and a bearing in said casing or framework distant from said gears in which the free end of said shaft runs, said bearing being sleeve-like in form and projecting inwardly toward said gears, whereby said shaft when moved toward said distant bearing is kept from projecting objectionably beyond said bearing.

11. The combination of a casing or framework having a discharging-mouth at each end and a receiving mouth or hopper at one end, a screw conveyer in said casing extending between said discharging-mouths, a shaft to said screw conveyer, a train of gears for operating and reversing said shaft, means for shifting the reversing mechanism operated by longitudinal movement of the shaft itself, a valve to the discharging-mouth which is opposite the receiving-mouth, and connections between said valve and said shaft.

In witness whereof I have hereunto set my hand and seal, at Indianapolis, Indiana, this 6th day of September, A. D. 1905.

GEORGE L. CHATFIELD. [L. S.]

Witnesses:
CHESTER BRADFORD,
JAMES A. WALSH.